(No Model.) 2 Sheets—Sheet 1.
C. THOMPSON.
CONVEYER.
No. 588,297. Patented Aug. 17, 1897.
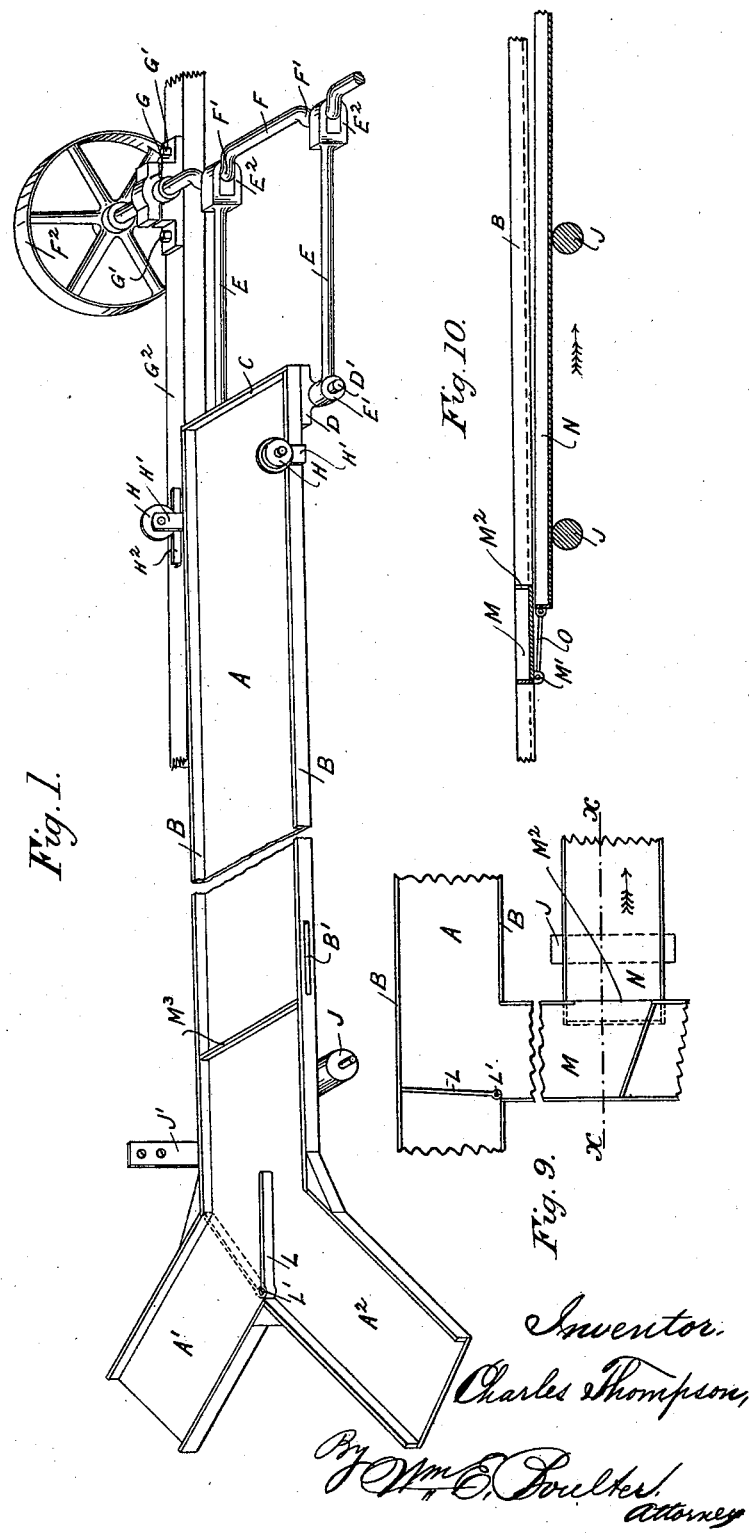
Witnesses:
L. C. Hills
L. D. Kingsbury
Inventor.
Charles Thompson,
By Wm. E. Poulter
Attorney (No Model.) 2 Sheets—Sheet 2.
C. THOMPSON.
CONVEYER.
No. 588,297. Patented Aug. 17, 1897.
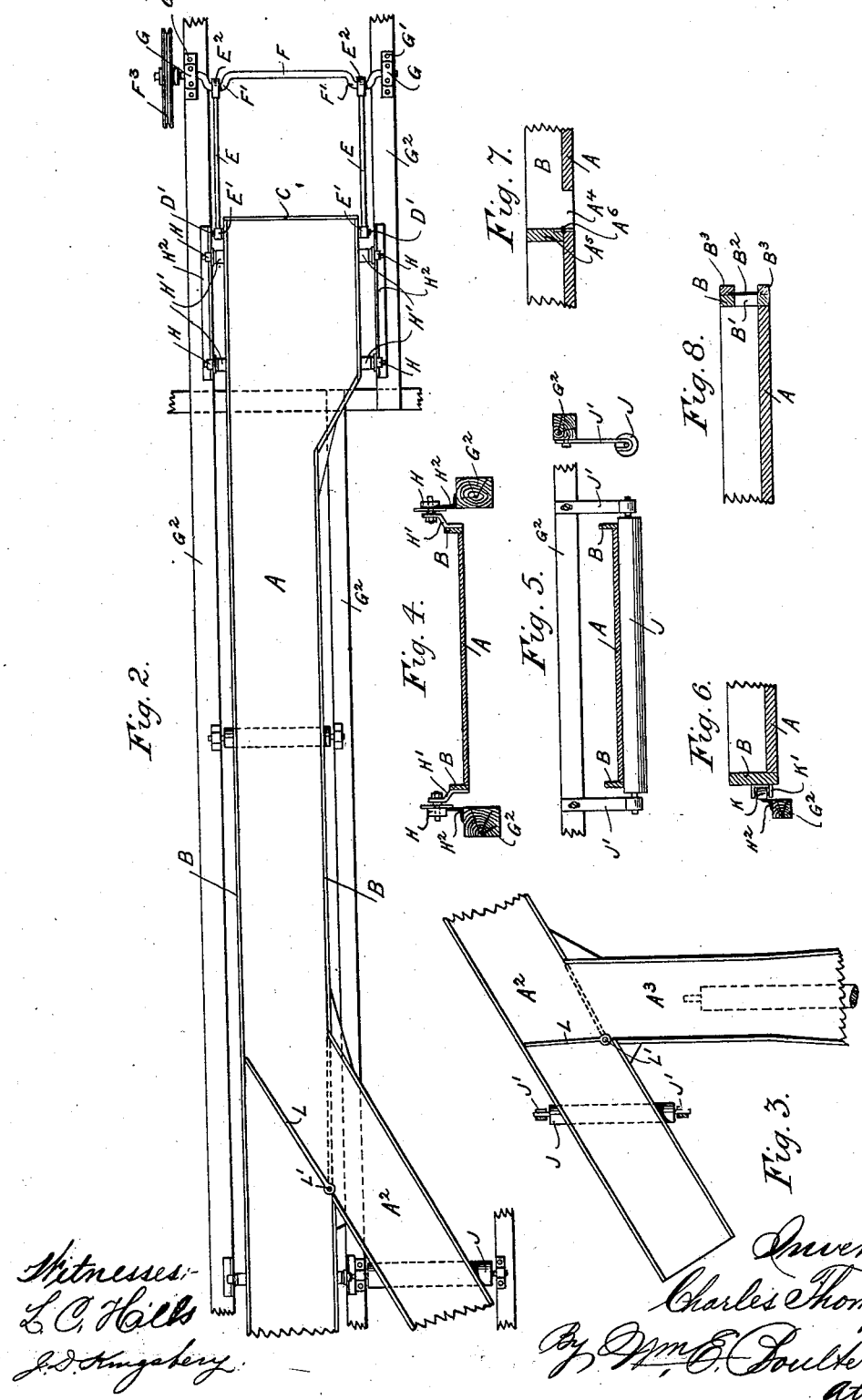
Witnesses:
L. C. Hills
J. D. Kingsbury
Inventor:
Charles Thompson,
By Wm. E. Coulter,
Attorney.

UNITED STATES PATENT OFFICE.

CHARLES THOMPSON, OF GRANTHAM, ENGLAND.

CONVEYER.

SPECIFICATION forming part of Letters Patent No. 588,297, dated August 17, 1897.

Application filed November 30, 1895. Serial No. 570,673. (No model.)

*To all whom it may concern:*

Be it known that I, CHARLES THOMPSON, malster, a subject of the Queen of Great Britain, residing at Grantham, in the county of Lincoln, England, have invented certain new and useful Improvements in Means or Apparatus for Conveying Substances, such as Grain, Minerals, and the Like, of which the following is a specification.

This invention relates to improvements in means or apparatus whereby substances, such as grain, minerals, and the like, may be (with much less power than heretofore required) conveyed from one part of a building to any other part. The invention may be also used for conveying the said and like substances in the open air.

To carry out my invention, I construct a trough or conveyer of material suitable to the purpose for which it is to be used and of a strength in accordance with the load to be carried.

The conveyer may be of any length, width, and depth convenient for the purpose and covered or uncovered, as desired, and be supported by pillars from the floor or hangers or bearings depending from joists or beams above.

At the front end of the conveyer—*i. e.*, the end where the grain or other substance is received or placed therein—I mount in suitable bearings a crank-shaft or equivalent driven by a suitable rope wheel or pulley and connect the crank or cranks by means of a connecting rod or rods (in accordance with the width of the conveyer) to the end or sides thereof. It will be obvious, therefore, that when the crank-shaft is set in motion the conveyer will have a to-and-fro movement. To transmit the grain or other substance along the conveyer, the latter is slightly inclined from the horizontal. An incline of one in ninety is an effective declivity; but this may be modified to a greater or less extent to suit the substances to be conveyed or the headway it is desired to retain underneath the conveyer. The conveyer may be in one straight length or branch away in any direction suitable to the nature of the building, and is provided with slides or flaps for discharging the substance either from the sides or bottom at any required point or points. In the case of a grain-conveyer a stop or board placed across at right angles thereto is sufficient to effect the delivery of the grain through a hole in the side or bottom; but in a conveyer for coal and the like the stop or board may be placed at an angle of forty-five degrees for side delivery.

The conveyer may be supported, as before mentioned, either from below or above and suitable antifriction wheels or rollers provided at certain points in its length in accordance with the load to assist the easy to-and-fro movement of the conveyer.

It is obvious that at each forward movement of the conveyer the substance or material therein will be carried along with it and the forward throw of the substance or material is continued when the conveyer is withdrawn by the return movement. Under these conditions since the load carried is so moved that it is never lifted as a dead-weight the power required to operate the conveyer is very small.

The invention will be fully understood by reference to the drawings accompanying this specification, wherein—

Figure 1 is a perspective view of a conveyer constructed in accordance with this invention. Fig. 2 is a plan of a conveyer, showing the receiving end widened out to allow for any spread of the material or substance for screening purposes (the screen not shown) and the crank-shaft actuated by a rope-wheel. Fig. 3 shows a continuation of the branch shown in Fig. 2 with another branch diverging from same. Fig. 4 is a cross-section of the conveyer, showing how the antifriction wheels or rollers are connected thereto. Fig. 5 is a similar view of one form of hanger or bearing and roller for supporting the conveyer. Fig. 6 is a cross-section, drawn to a large scale, showing an antifriction-roller to prevent side movement. Fig. 7 is a longitudinal section showing one form of flap. Fig. 8 is a cross-section showing a slide for covering a hole in the side of the conveyer. Fig. 9 is a plan showing a branch at a right angle to the main truck or branch of the conveyer and a branch for back-delivery. Fig. 10 is a longitudinal section on the line $x\,x$ of Fig. 9.

Like letters of reference indicate like parts in all the figures.

A is the bottom, B B the sides, and C the front end, of a conveyer, which for grain and like substances may be made of planed deal, but when intended for conveying coal, stone, and the like must be made of a material into which the said minerals cannot cut, or else faced with sheet-iron, tin, or equivalent means to preserve the surface of the conveyer. On the under side and near the end blocks D are attached by bolts or screws, through which pass the pins or studs D' to receive the ends E' of the connecting-rods E. The opposite ends $E^2$ of the said rods E are formed in any suitable manner to surround the cranks F' on the crank-shaft F, the latter being carried in pedestals or bearings G, attached by bolts G' to the supporting plates or bearers $G^2$. In Figs. 1 and 2 two connecting-rods E are shown, but with narrow conveyers a block D may be placed central in the end and connected by a single rod E to the crank-shaft.

Only one bearing G is shown in Fig. 1, but the crank-shaft may have bearings on each side, as shown in Fig. 2. The crank-shaft F is actuated by a belt (not shown in the drawings) passing around the pulley $F^2$, Fig. 1, or a rope and rope-wheel $F^3$, Fig. 2, may be substituted for the said belt and pulley. A suitable speed for the said shaft F is one hundred and twenty revolutions per minute with a crank having a throw of four inches.

The conveyer is supported by the plates or bearers $G^2$ and antifriction wheels or rollers H, carried in the bearings H', (most clearly shown in Fig. 4,) the said wheels or rollers moving along angle-irons $H^2$ or equivalent guideways or rails screwed to the supporting-plates $G^2$, or it may be supported by rollers J, carried in the adjustable hangers or bearings J', depending from the joists or beams above the conveyer, according to the construction of the building, the said hangers or bearings being adjustable in any convenient way to keep the conveyer supported at the required incline.

As before stated, the conveyer may be supported at convenient intervals along its length, according to the strength of the conveyer and the load it has to carry, the wheels or rollers being mounted in a line parallel with the crank-shaft. To prevent any side movement of the conveyer, rollers K, Fig. 6, are carried in the brackets K', attached to the sides of the conveyer, the rollers moving in contact with the sides of angle irons or plates $H^2$.

In Fig. 1 the conveyer is shown with parallel sides, but in certain cases—such, for instance, when grain or corn is to be conveyed—it may be desirable to form the front or other part where the grain or corn is received in plan somewhat of the shape shown in Fig. 2 to allow of the spread of the substance for screening purposes, so that the grain or corn shall pass from the said widened part over the screen at less depth than at the remaining part of the conveyer. This screening-bed may be placed at any point in the conveyer. The conveyer may be in one straight length or, as shown in Fig. 1, branch off in any required direction, such as A' $A^2$, or at a right angle, as in Fig. 9, to suit the construction of the building. In Fig. 3 a further branch $A^3$ is shown, leaving the branch $A^2$ at a right angle to the crank-shaft F, supported by rollers or bearers, as before mentioned, and having the same fall from side to side as $A^2$ has lengthwise, and having also a suitable incline.

To deliver backward—i. e., in relation to the main trunk and in the direction of the arrows, (see Figs. 9 and 10,)—a branch M may be constructed at any desired point of the main trunk of the conveyer, and at any point in the sides of the branch M an opening $M^2$ may be made, under which may be placed the end of a trough N, connected to the branch M at M' by a connecting-rod O and supported by rollers J, as before described.

Openings B', provided with a slide $B^2$, held in position by projecting strips $B^3$, (see Fig. 8,) are arranged in the sides B of the conveyer at any point for side delivery, in which case a board or plate $M^3$ is placed across the conveyer to turn the grain or other substance, but if bottom delivery is requisite or desired openings $A^4$ are arranged and provided with a flap $A^5$, hinged at $A^6$, as shown in Fig. 7.

When the conveyer is constructed to branch out, as shown in Figs. 1, 2, 3, 9, and 10, a board or plate L is pivoted at L', so that it can be turned either way to direct the grain or other substance in the required direction. It is obvious that when erected in a building the supports carrying the conveyer are attached to any beams, joists, or struts therein which are convenient for the purpose.

Although the conveyer is shown actuated at the front end the said actuating mechanism may be placed at any convenient point along its length, and if connected about midway between the two ends it would impart rigidity to the conveyer, and advantage may be taken of any shaft conveniently situated upon which to mount the said actuating mechanism, which may consist of other mechanism than the crank without departing from the spirit of the invention.

What I claim is—

1. The combination with a conveyer adapted to be reciprocated in a straight line, of a crank-shaft arranged transversely of the conveyer and rotatably mounted in suitable bearings, a rod pivotally connected at one end to the conveyer and at the other end to the crank of the crank-shaft, supporting-pieces arranged longitudinally of the conveyer, rollers carried by the sides of the conveyer and traveling upon the supporting-pieces, the latter being arranged at an inclination whereby the conveyer will be at an incline from its receiving end to its discharge end.

2. The combination with a conveyer adapted to be reciprocated in a straight line, of a crank-shaft arranged transversely of the conveyer and rotatably mounted in suitable bearings, a rod pivotally connected at one end to the conveyer and at the other end to the crank of the crank-shaft, supporting-pieces arranged longitudinally of the conveyer, guide-rails carried by said pieces, rollers carried by the sides of the conveyer and traveling upon the guide-rails, the said supporting-pieces being arranged at an inclination whereby the conveyer will be at an incline from its receiving end to its discharge end, and rollers K carried by the conveyer and moving in contact with the sides of the guide-rails.

3. The combination with a conveyer adapted to be reciprocated in a straight line, of a crank-shaft arranged transversely of the conveyer and rotatably mounted in suitable bearings, a rod pivotally connected at one end to the conveyer and at the other end to the crank of the crank-shaft, supporting-pieces arranged longitudinally of the conveyer, rollers carried by the sides of the conveyer and traveling upon the supporting-pieces, the latter being arranged at an inclination whereby the conveyer will be at an incline from its receiving end to its discharge end, a branch section communicating with the main trunk or portion of the conveyer, and a gate pivotally connected to the conveyer and adapted to direct the material into the branch section.

In testimony whereof I have signed my name to this specification in the presence of two subscribing witnesses.

CHARLES THOMPSON.

Witnesses:
T. S. SHOULES,
WALTER W. BALL.